US006357232B1

(12) United States Patent
Strashny

(10) Patent No.: US 6,357,232 B1
(45) Date of Patent: Mar. 19, 2002

(54) DIFFERENTIAL PEDAL INTERFACE SYSTEM FOR A CYCLING TYPE WORK MACHINE

(75) Inventor: Igor Strashny, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 09/464,467

(22) Filed: Dec. 15, 1999

(51) Int. Cl.[7] .......... F16D 31/02
(52) U.S. Cl. .......... 60/431; 74/512
(58) Field of Search .......... 60/431, 443; 74/512, 74/513, 560; 92/12, 2

(56) References Cited

U.S. PATENT DOCUMENTS

| | | | | | |
|---|---|---|---|---|---|
| 3,943,712 A | * | 3/1976 | Stuhr | 60/431 |
| 3,952,512 A | | 4/1976 | Feller | 60/431 |
| 4,064,769 A | | 12/1977 | Amdall et al. | |
| 4,130,025 A | | 12/1978 | Dawson | |
| 4,156,370 A | | 5/1979 | Callaghan | |
| 4,250,768 A | | 2/1981 | Hildebrecht | 74/512 |
| 4,297,909 A | | 11/1981 | Crouse | |
| 4,346,617 A | | 8/1982 | Schroeder et al. | |
| 4,523,489 A | | 6/1985 | Gault | |
| 4,543,850 A | | 10/1985 | Bednar et al. | 74/512 |
| 4,759,417 A | | 7/1988 | Wanie et al. | 74/474 |
| 4,883,137 A | | 11/1989 | Wanie et al. | 74/474 |
| 4,955,627 A | | 9/1990 | Hartmann | |
| 4,958,535 A | | 9/1990 | Swartzendruber | |
| 5,022,477 A | | 6/1991 | Wanie | 74/474 |
| 5,048,638 A | | 9/1991 | Duncan et al. | 180/307 |
| 5,216,935 A | * | 6/1993 | Shimamura et al. | 74/512 |
| 5,408,899 A | * | 4/1995 | Stewart | 74/513 |
| 5,509,496 A | | 4/1996 | Erickson et al. | 74/474 |
| 5,553,453 A | | 9/1996 | Coutant et al. | |

* cited by examiner

*Primary Examiner*—Edward K. Look
*Assistant Examiner*—Thomas E. Lazo

(57) ABSTRACT

A differential pedal interface system for controlling the forward and reverse speed, acceleration, deceleration, and jerk of a work machine including foot pedals coupled to each other for differential movement, displacement of one pedal controlling movement in the forward direction and displacement of the other pedal controlling movement in the reverse direction. The present system further includes at least one sensor coupled to one of the pedals for determining their displacement and rate of movement and an electronic controller coupled to the at least one sensor for receiving signals therefrom, the controller being operable to control the speed, acceleration, deceleration, and jerk of the work machine based upon the signal inputs.

22 Claims, 5 Drawing Sheets

DIFFERENTIAL PEDAL INTERFACE SYSTEM FOR A CYCLING TYPE WORK MACHINE

TECHNICAL FIELD

This invention relates generally to operator interface systems for controlling the movement and operation of a work machine and, more particularly, to a differential pedal interface system for controlling the locomotion of a work machine.

BACKGROUND ART

Currently, when driving a work machine such as a wheel loader, the machine operator is faced with simultaneously controlling machine speed, jerk, acceleration, deceleration, direction, steering and implements. In fact, control of some of these parameters is achieved indirectly. For example, when driving a conventional wheel loader, the operator controls the operation and performance of the machine through a conventional interface system which includes operating and controlling a plurality of interface devices such as a throttle pedal, impeller clutch/brake pedal, brake pedals, toggle and other types of switches, steering wheel or joystick, implement levers or joystick, and other interface controls. Typically, a combination of operator control inputs to a plurality of the above-identified control inputs are necessary in order to achieve a specific control function such as speed, acceleration, deceleration, forward or reverse movement, steering and implements. Conventional interface speed control functions in the forward or reverse direction likewise involve use of both feet, while low speed operation is further complicated by machine-to-machine variations associated with the impeller-brake pedal adjustment. In order to achieve desired speed on certain wheel loaders, the operator controls engine torque by varying the throttle setting. In order to maneuver the machine at slow speeds, the operator must control both the throttle setting and the impeller clutch pedal. Also, acceleration of the machine involves control inputs different from the inputs necessary to achieve deceleration of the machine. In addition, often times switches such as a forward/reverse direction switch needs to be actuated and coordinated with movements of the operator's feet while steering and otherwise controlling the machine. To effectively control all of these parameters, while simultaneously manipulating the plurality of interface devices, requires that the operator have extensive experience in operating and controlling the particular machine.

In this regard, it would be beneficial to control machine parameters in a direct fashion so as to reduce the total number of control inputs which must be exercised by the operator. This can be accomplished by consolidating intuitively associated variables with a particular input. However, this puts a greater emphasis on the operator's ability to precisely control the particular input. Therefore, while it is possible for an inexperienced operator to adequately control a particular machine, the operator will normally not be able to take advantage of the machine's full potential or capability until after some operator time has been achieved. It is therefore desirable to have an operator interface system which is simple, intuitive, predictable, precise and easy to learn.

Additionally, terrain irregularities have the potential to be transferred into undesirable control inputs. Uneven terrain and other irregularities are common in the work environment where these types of machines are routinely used and, often times, such uneven terrain affect the various operator inputs to control the operation of the machine. As a result, it is often necessary for the operator to operate the machine at a substantially lower speed when encountering irregular terrain. Operating the machine at lower speeds reduces the ability to complete a particular task.

Irregular terrain therefore translates into unwanted mechanical disturbances which may be inputted to the machine via the operator input system. Consider, for example, a single pedal whose position is mapped into desired machine speed. As the operator varies the pedal's displacement, the machine accelerates or decelerates to match the speed setting marked by the pedal's position. The operator's ability to precisely control such input may be satisfactory on a smooth highway, but will degrade substantially when the machine travels over rough terrain or engages in a cycling application such as truck loading. In fact, when the machine travels over bumps, the operator's foot will bounce, resulting in abrupt changes in the requested speed, causing sudden acceleration and deceleration of the machine, or jerk, with the potential for self-excitation to occur in the operator-machine interface system.

Since conventional interface systems are complicated and cumbersome to control, particularly for an inexperienced operator, it is desirable to design an operator-machine interface system which not only allows inexperienced operators to easily utilize the machine's full potential, but which allows the speed, acceleration, deceleration and jerk of the machine to be controlled through a minimum number of operator inputs. It is also desirable to provide an interface system which will effectively cancel unwanted mechanical disturbances due to travel over irregular terrain.

Accordingly, the present invention is directed to overcoming one or more of the problems as set forth above.

DISCLOSURE OF THE INVENTION

In one aspect of the present invention, an operator-machine differential pedal interface system is disclosed wherein a pedal arrangement is positioned and located in the operator compartment, the present pedal system being symmetrically located to the left and right of the steering column such that the operator can comfortably deflect such pedals with the left and right foot respectively. The present pedals are linked in such a way that if one pedal is deflected in a certain direction, the other pedal moves an equal amount in the opposite direction. Also, one pedal controls movement in the forward direction and the other pedal controls movement in the reverse direction. For example, the right pedal can be configured to control movement in the forward direction whereas the left pedal can be configured to control movement in the reverse direction. In the absence of control input from an operator, the present pedal system includes a mechanism for self-centering the respect pedals to a neutral position.

Importantly, several embodiments of the present pedal system include at least one sensor positioned and located so as to output a signal indicative of the relative position or displacement of the pedals in either the fore or aft direction relative to a centered/neutral position. This position sensor is coupled to an electronic control module (ECM), or other processing or controller means, and continuously outputs signal(s) to the ECM indicative of pedal displacement. Based upon both pedal position and the rate of movement of such pedals, the ECM, or other control means, is programmed to output appropriate signals to appropriate machine control systems to control the speed, acceleration, deceleration, and jerk of the machine in either the forward or reverse directions. For example, if the right pedal is configured to control forward movement of the machine and the left pedal is configured to control reverse movement of the machine, movement of the right pedal in a forward direction away from a centered or neutral position will be interpreted by the ECM as an operator input command requesting that the machine accelerate to and achieve a desired machine speed in the forward direction. The acceleration of the machine to the desired speed is a function of the rate of movement and/or position of the right pedal in the forward direction, and the requested final speed of the machine is a function of the final position or displacement of the right pedal relative to the centered or neutral pedal position. The rate of movement of the right pedal can be determined by the ECM based upon the relative change of the displacement of the pedal over time. The same correlation is likewise true with respect to movement of the machine in the reverse direction, the acceleration and final speed of the machine in the reverse direction being controlled by the final position and rate of movement of the left pedal in a forward direction relative to the centered or neutral pedal position. Deceleration of the machine is likewise a function of the rate of movement and/or position of the pedals.

Jerk of the machine is likewise controlled through the maps programmed into the ECM. In addition, since the present pedal system is coupled together such that the respective pedals move in an equal and opposite direction relative to their respective centered or neutral positions, unwanted mechanical disturbances due to travel over irregular terrain as well as other unwanted operator inputs can be more easily controlled since both feet of the operator rests on the pedals and one foot functions to stabilize and control inputs from the other foot, whether these inputs are wanted or unwanted. Use of both feet in conjunction with the differential movement of the present pedal system therefore enables an operator to brace and prevent unwanted pedal displacement due to machine jerk which may result from terrain irregularities, aggressive machine operation, or other sources.

The present pedal system may also include a self-centering mechanism, and a speed control mechanism for further controlling the movement and operation of a particular work machine. In this regard, the self-centering mechanism ensures that the differential pedal system returns to its centered or neutral position whenever the operator is not inputting control to the pedals; and the speed control mechanism enables the operator to select a maximum speed for the machine based upon certain environmental or operating conditions.

In another aspect of the present invention, the present differential pedal system is operatively connected directly to the hydrostatic transmission or other transmission system associated with a particular work machine such that differential movement of the foot pedals will selectively engage the transmission such that the work machine is operated in either the forward or the reverse direction. In this particular embodiment, no ECM is utilized and the speed, direction, acceleration, deceleration and jerk of the work machine will be proportional to the position and rate of change of the swash plate and the swash plate angle respectively of the transmission, which swash plate position and angle will likewise be proportional to the displacement and rate of change of the differential pedals.

The various embodiments of the present differential pedal system therefore function as a single operator control input to control the speed, acceleration, deceleration and jerk of a particular work machine in both the forward and reverse directions. The present systems lead to a high degree of precision with respect to controlling desired machine speed, acceleration, deceleration, jerk, and machine direction; they provide better control of the machine over rough terrain thereby allowing the operator to operate the machine at higher speeds resulting in higher productivity; and they allow inexperienced operators to easily and controllably utilize the machine to its fullest potential. In addition, the present systems represent simple, intuitive, predictable and easy to learn interface systems which greatly enhances machine utilization under a wide variety of different operating conditions and such systems can be easily coupled and operatively connected to appropriate machine systems such as engine and transmission control systems for selectively controlling the locomotion of the machine.

The present differential pedal systems can be incorporated into any type of work machine in accordance with the teachings of the present invention.

BRIEF DESCRIPTION OF THE DRAWINGS

For a better understanding of the present invention, reference may be made to the accompanying drawings in which.

BEST MODE FOR CARRYING OUT THE INVENTION

The present operator interface control systems consolidate and reduce the total number of control inputs which must be exercised by the operator in order to control desired machine parameters and such systems allow the speed, acceleration, deceleration, direction of movement (forward/reverse) and jerk to be controlled through a single control input, namely, a differential pedal system activated and controlled through the use of the operator's feet.

Figure 1:
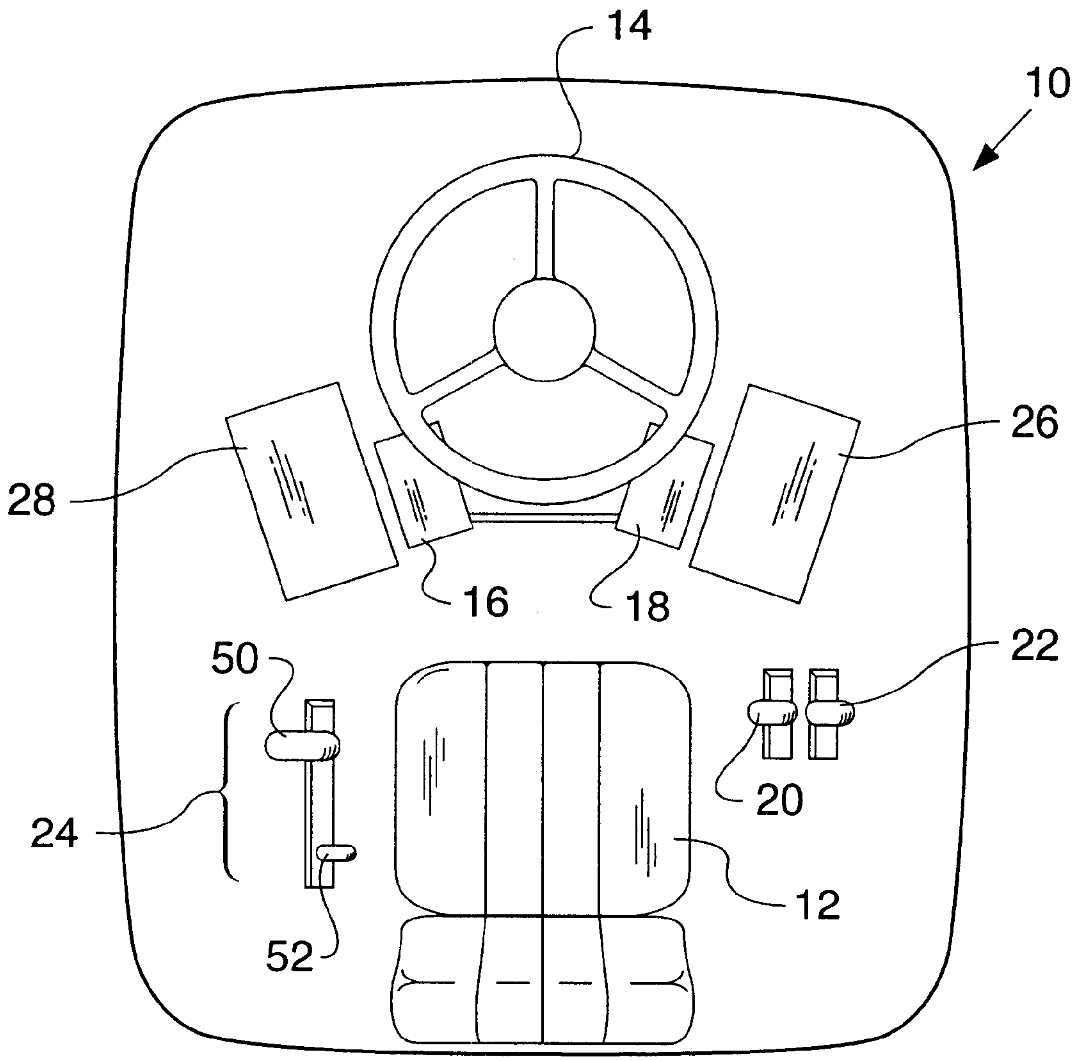
FIG. 1 is a top view of an operator's compartment associated with a particular machine illustrating the position and location of the present differential pedal system in such compartment.

Referring to FIG. 1, numeral 10 in FIG. 1 represents one embodiment of an operator compartment having an operator seat 12, a steering wheel 14, a pair of brake pedals 16 and 18, a pair of implement levers 20 and 22, a speed control unit 24, and a pair of differential pedals 26 and 28 which comprise the present invention. Pedals 26 and 28 are located symmetrically on each opposite side of the steering wheel 14 and are positioned and located such that an operator can easily and comfortably control movement of such pedals when seated in the operator seat 12. As will be hereinafter explained with reference to FIG. 2, the pedals 26 and 28 are linked to each other such that equal and opposite differential pedal movement is achieved when one of the pedals is depressed or deflected in a particular direction. In other words, when one pedal such as pedal 26 is displaced a predetermined amount in a certain direction, the other pedal 28 is displaced an equal amount in the opposite direction. This differential movement of the present pedal system is important to the present invention and can be achieved in a variety of ways such as linking the pedals together through mechanical, electromechanical, hydraulic and/or pneumatic means as will be hereinafter explained.

Figure 2:
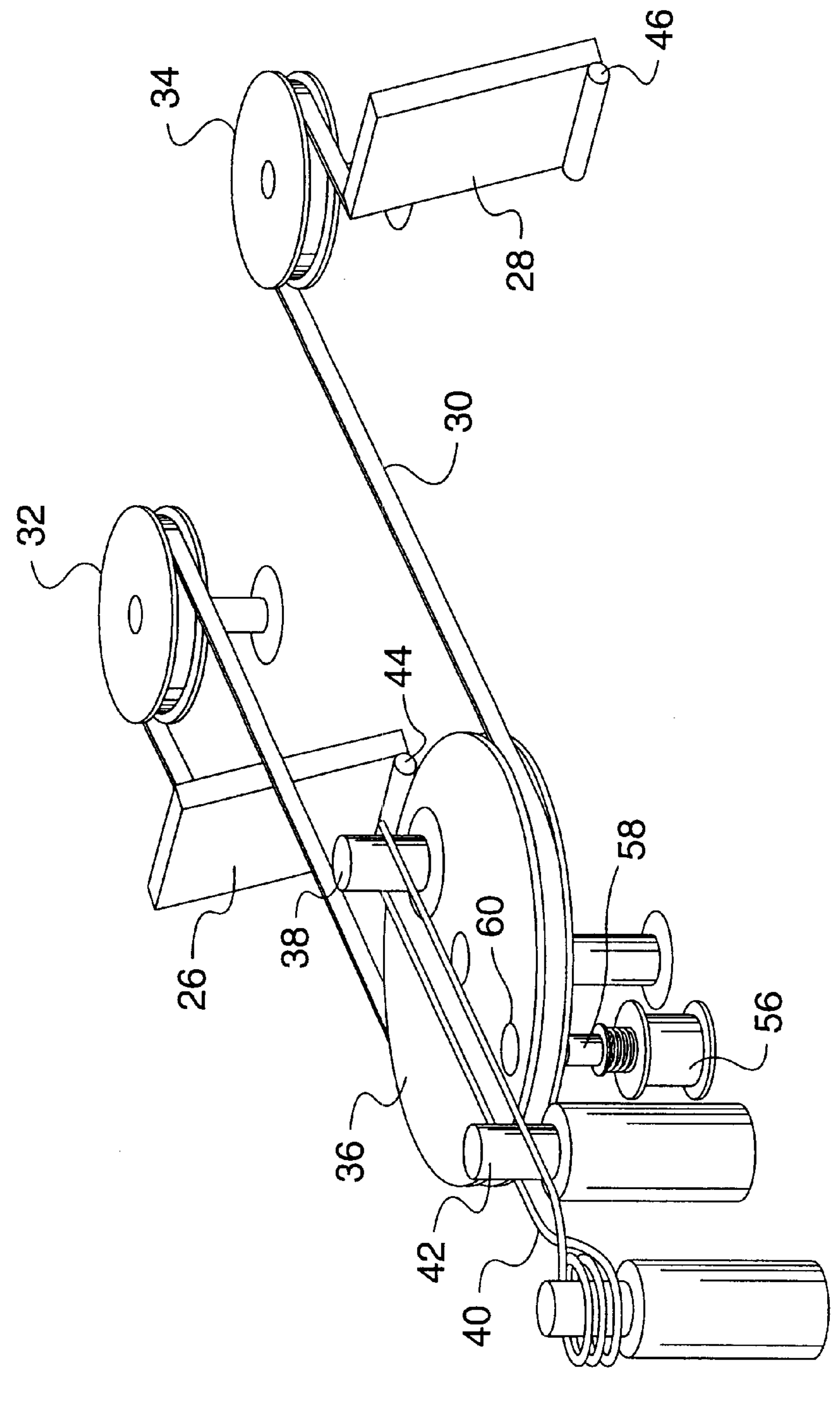
FIG. 2 is a perspective view of one embodiment of a differential pedal system constructed in accordance with the teachings of the present invention.

A kinematic illustration of one embodiment of the present pedal system is set forth in FIG. 2 wherein the present pedals 26 and 28 are mechanically coupled to each other through a belt and pulley system which includes a belt 30 and a plurality of pulleys 32, 34 and 36. Pulleys 32 and 34 are associated respectively with pedals 26 and 28 whereas main pulley 36 is centrally located therebetween and includes an upright post 38. The pulleys 32, 34 and 36 are positioned and located such that belt 30 will automatically position and align each respective pedal 26 and 28 to a centered or neutral position when no operator control is inputted to the pedals. In this regard, the opposite end portions of belt member 30 are each respectively attached to the pedals 26 and 28 as illustrated in FIG. 2. Operation and control of the work machine in either the forward or reverse direction of movement will be based upon deflection of the respective pedals 26 and 28 from their centered or neutral positions. In this particular arrangement, it is preferred that no slippage occur between the belt 30 and the respective pulleys 32, 34 and 36 and that a positive traction be maintained therebetween. In this regard, belt 30 could be a chain, cogged belt, or any other positive traction device.

The differential pedal system illustrated in FIG. 2 likewise includes a centering mechanism which keeps the pedals 26 and 28 centered in their neutral pedal position whenever the operator is not exerting a force or pressure thereagainst. This centering mechanism is implemented through the use of a spring member 40 which is positioned and located as illustrated in FIG. 2 so as to straddle a first post 42 and thereafter engage the post 38 associated with pulley 36. As either pedal 26 or 28 is deflected in a certain direction away from its centered or neutral position, the present pulley arrangement will cause the opposite pedal to move an equal amount in the opposite direction. Also, deflection of either pedal will likewise rotate pulley 36 about its associated post 38 in either a clockwise or counterclockwise direction thereby likewise deflecting spring member 40 around post 42 through its engagement with post 38. When this occurs, spring member 40 pivots or acts against post 42 such that when foot pressure is removed from both pedals 26 and 28, spring member 40 will return post 38 and pulley 36 to their normal "at rest" position as illustrated in FIG. 2. This "at rest" position corresponds to both pedals being located at their respective centered or neutral positions.

It is recognized and anticipated that the embodiment of the present differential pedal system illustrated in FIG. 2 is for illustrative purposes only and that other mechanisms and configurations for achieving both differential pedal movement and automatic centering of the pedals can be utilized without departing from the sprit and scope of the present invention. It is likewise anticipated that these functions can likewise be achieved through either electrical and/or mechanical and/or pneumatic and/or hydraulic configurations, or any combinations thereof.

Figure 3:
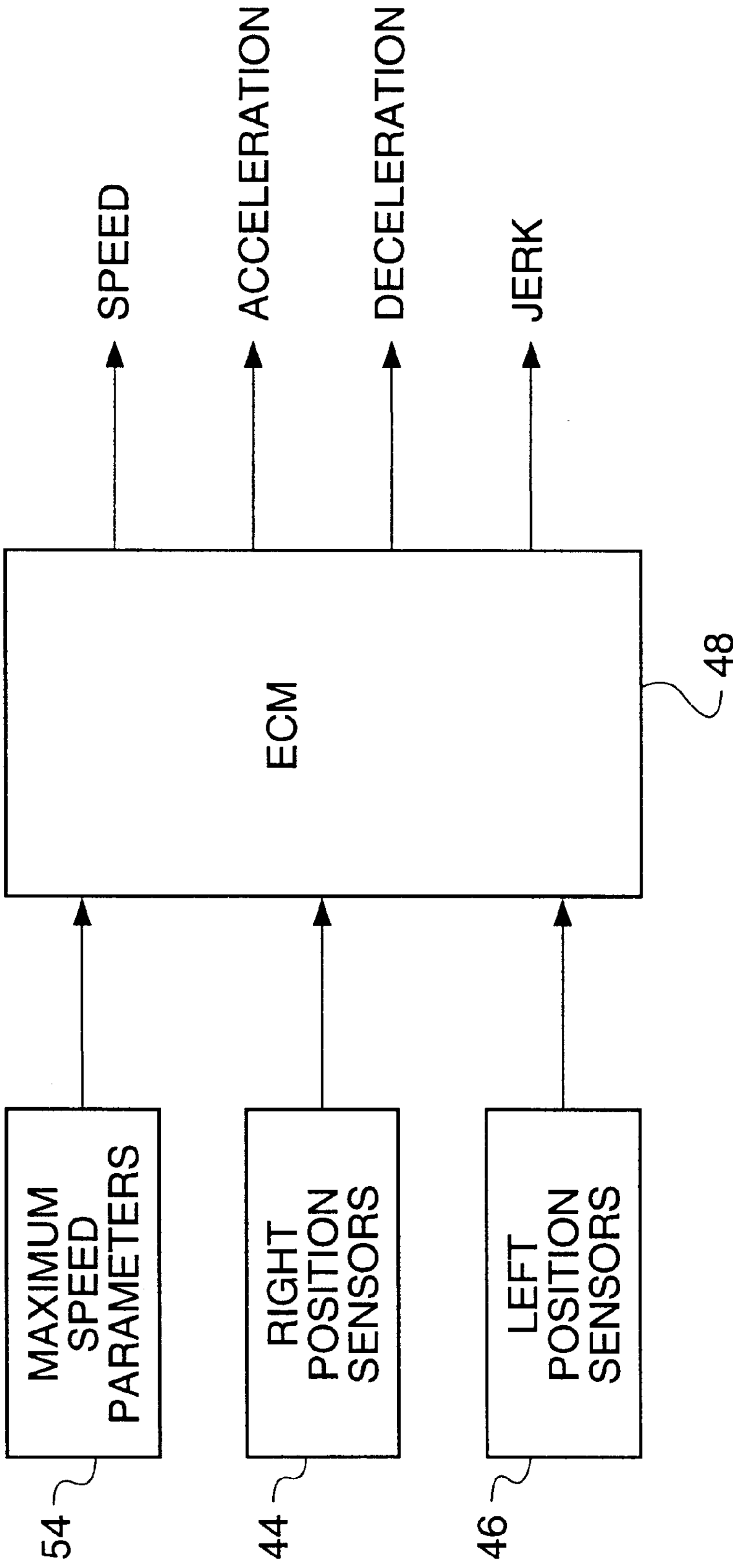
FIG. 3 is a block diagram of the present pedal control system showing the various inputs and outputs associated with the electronic control module.

The present differential pedal system of FIG. 2 also includes a pair of pedal displacement sensors 44 and 46, each sensor being respectively attached to one of the pedals 26 and 28 as illustrated in FIG. 2. The sensors 44 and 46 are coupled to an electronic control module (ECM) 48 as illustrated in FIG. 3 and input signals to the ECM indicative the actual displacement of each respective pedal. In one embodiment, the sensed displacement is relative to the pedal's centered or neutral position when depressed or deflected by the operator. The ECM 48 is programmed to output appropriate signals to appropriate machine systems to control the speed, acceleration, deceleration, and jerk of the machine in either the forward or reverse direction based upon the sensed pedal.

Direction of movement of the machine, is achieved by coupling the respective pedals 26 and 28 to the transmission system or other systems associated with the particular work machine such that movement of one pedal in one direction such as a forward direction relative to its centered or neutral position effects movement of the machine in the forward direction, and movement of the other pedal in the same direction such as a forward direction relative to its centered or neutral position effects movement of the machine in the reverse direction. The ECM 48 can therefore be programmed to sense which pedal is being moved forward relative to its neutral position and thereafter output an appropriate signal to the appropriate control system to effect movement in either the forward or reverse direction. Speed of the machine is programmed into the ECM 48 based upon the actual amount of forward displacement of a particular pedal relative to its centered or neutral position. The greater the displacement of a particular pedal in a particular direction such as forward of its center or neutral position, the greater the overall speed being commanded by the operator. In one embodiment, a pedal displacement map may be utilized to correlate pedal displacement with a desired machine movement. The result of the correlation includes delivering the appropriate signal to the appropriate control system to effect movement in either the forward or reverse direction.

The acceleration and deceleration of the machine is likewise programmed into ECM 48 based upon the rate of movement or position of the pedals 26 and 28 in a direction relative to their respective centered or neutral positions. In this regard, the sensors 44 and 46 will continuously sense the changing position of the pedals and will input appropriate signals to ECM 48 indicative of the changing relative position of such pedals. Based upon these sensed inputs, the ECM 48 will determine the rate of movement of the appropriate pedal in either direction, and will output an appropriate signal to the appropriate machine control system to either accelerate or decelerate to the desired speed requested by the operator based upon pedal displacement in accordance with an acceleration/deceleration mapping or correlation programmed into ECM 48. In this regard, machine jerk is likewise controlled through the programming of ECM 48.

Although the differential pedal system of FIG. 2 is illustrated as using two sensors 44 and 46, since the respective pedals 26 and 28 are coupled together for differential operation, the present system would operate equally as well with a single sensor attached to or otherwise associated with one of the respective pedals. In this regard, ECM 48 would be programmed to recognize pedal movement in one direction as requesting machine movement in a forward direction, whereas movement of that same pedal in the opposite direction relative to that pedal's centered or neutral position would be recognized as requesting movement in the reverse direction. In the preferred embodiment, the pedal movement is sensed relative to the pedals centered or neutral position To utilize the present invention and operate a machine equipped with the differential pedal interface system of FIG. 2, an operator would place his or her feet on the respective pedals 26 and 28 and deflect such pedals to achieve desired machine behavior. Assuming that the right pedal 26 controls movement of the machine in the forward direction and that the left pedal 28 controls movement of the machine in the reverse direction, the centered or neutral position associated with both pedals is programmed to be a zero speed or "at rest" condition. In other words, when both pedals 26 and 28 are in their respective centered positions, no movement of the machine in either the forward or reverse direction is being commanded by the operator and ECM 48 recognizes this sensor position to be a zero speed position. The ECM 48 thereafter interprets any pedal deflection relative to the centered or neutral pedal position to be a desired machine speed in a particular direction such that displacement of the right pedal 26 in one direction moving away from the neutral position should be translated as a desired speed in the forward direction, and displacement of the left pedal in in the same direction moving away from its neutral position should be translated as a desired speed in the reverse direction. Each incremental displacement of the pedals 26 and 28 in a particular direction such as a forward direction from their centered or neutral position to their maximum deflection position is correlated and matched to a specific machine speed between a zero speed and the machine's maximum speed, and this correlation is mapped or otherwise programmed into ECM 48 such that when ECM 48 receives a signal from the appropriate sensor 44 or 46 indicative of the displacement of one of the pedals 26 or 28 in that particular direction, the ECM 48 will output an appropriate signal to the appropriate machine systems to achieve the desired machine speed being requested by the particular pedal position.

The present pedal system may also optionally include a machine speed control unit 24 (FIG. 1) which enables an operator to select a maximum speed for both the machine and the engine to improve performance for a particular task. Speed control unit 24 may include a first slider control or other operator selectable switch means 50 for setting maximum machine speed and a second slider control or other operator selectable switch means 52 for setting maximum engine speed. In this regard, it is recognized and anticipated that any control system 24 and any operator input means 50 and 52 can be utilized to allow the machine operator to set these maximum speed parameters. As a result, based upon particular terrain and environmental conditions as well as other parameters dictated by the particular operating conditions involved, an operator can select and control the maximum speed of both the machine and the engine based upon the position of operator controls 50 and 52. For example, slider control or switch 50 may be programmed to select a machine speed ranging between 0 mph and 30 mph. In similar fashion, slider control or switch 52 can be utilized to select an engine speed between a minimum and maximum engine rpm. Once the operator sets speed controls 50 and 52, the maximum speed parameters 54 selected by the position of the controls 50 and 52 will be inputted to ECM 48 as best shown in FIG. 3. The maximum speed parameters 54 are then utilized by ECM 48 to recalibrate and adjust the speed, acceleration, deceleration and jerk of the machine based upon pedal displacement and rate of movement as previously explained. This mapping or recorrelation of pedal displacement/pedal rate of movement is programmed into ECM 48.

The present differential pedal system may likewise optionally include a pedal lock mechanism which ensures that unwanted pedal movement is prohibited, particularly, if the operator exists the operator compartment while the work machine engine is still operating. One embodiment of such a pedal lock system is illustrated in FIG. 2 and includes a pedal lock solenoid 56 having a plunger member 58 operable to engage an opening 60 associated with main pulley 36. The solenoid 56 can be coupled to any switch or other operator control mechanism located in the operator compartment, the activation of which will extend plunger 58 into engagement with opening 60 thereby locking and preventing main pulley 36 from rotating in either direction. In this regard, opening 60 is positioned and located on pulley 36 such that when the solenoid plunger 58 is engaged with opening 60, the pedals 26 and 28 are in their respective centered/neutral positions. When so engaged, the pedals 26 and 28 are prohibited from moving do to the engagement of solenoid plunger 58 with pulley opening 60. As a result, unwanted movements of the pedals 26 and 28 are prevented. In a preferred embodiment, solenoid 56 is coupled to the operator seat of the work machine through conventional switch means such that when the operator stands up to exit the work machine, solenoid 56 will be automatically energized to lock main pulley 36 as previously explained. In this regard, the centering mechanism associated with the present differential pedal system will automatically center pedals 26 and 28 as the operator begins to exit the work machine permitting engagement of pedal lock solenoid 56.

In one embodiment, service brakes 16 and 18 may be provided as an alternative, or supplemental means of braking. Since the present differential pedal system efficiently controls acceleration and deceleration of the work machine, stopping of the work machine can be easily accomplished and achieved through proper positioning and differential movement of the pedals 26 and 28.

Figure 4:
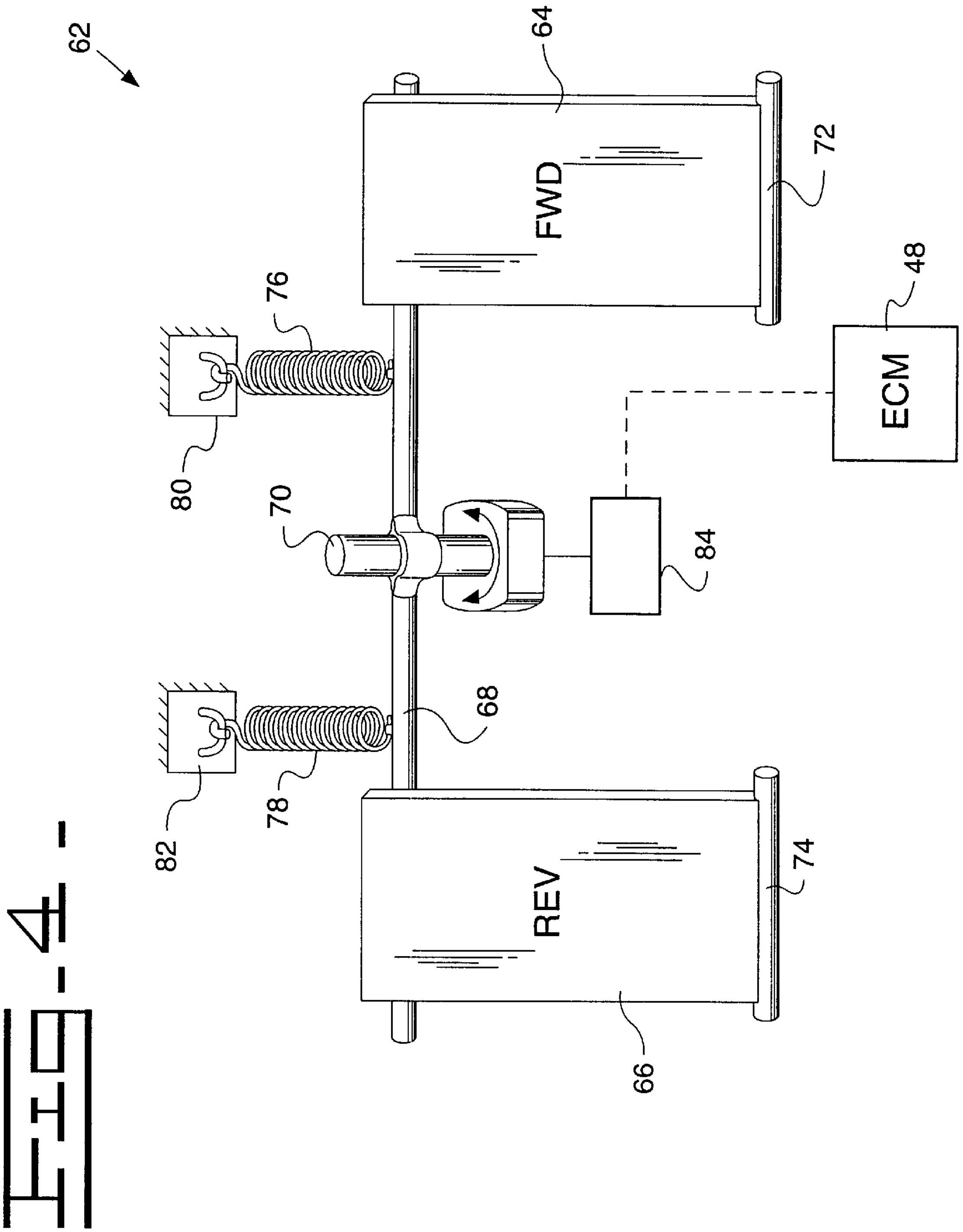
FIG. 4 is a schematic diagram showing another embodiment of the present differential pedal system.

FIG. 4 represents a kinematic illustration of another embodiment 62 of the present pedal system wherein the present pedals 64 and 66 are again coupled in such a manner that equal and opposite differential pedal movement is achieved when one of the pedals is depressed or deflected in a particular direction. In this particular embodiment, differential pedal movement is achieved through the use of a differential linkage member 68 which is coupled or otherwise attached to a linkage pivot member 70. Rotational movement of the linkage member 68 about pivot member 70 will cause differential movement of pedals 64 and 66. In this regard, the respective pedals 64 and 66 are each pivotally mounted to the floor or other supporting surface associated with the operator cab of the work machine such as through the use of pedal pivot members 72 and 74 illustrated in FIG. 4. The pedals 64 and 66 are each respectively attached or otherwise coupled to the members 72 and 74 such that the pedals will pivot about such members as they are moved away from and towards their respective centered or neutral positions. Operation and control of the work machine in either the forward or reverse direction of movement will again be based upon deflection of the respective pedals 64 and 66 away from their centered or neutral positions as will be hereinafter explained.

The differential pedal system illustrated in FIG. 4 likewise includes a centering mechanism which keeps the pedals 64 and 66 centered in their neutral pedal position whenever the operator is exerting a force or pressure thereagainst which is below a predetermined threshold foot pressure. This centering mechanism is implemented through the use of a pair of spring members 76 and 78 which are positioned and located as illustrated in FIG. 4 so as to be substantially equally spaced on each opposite side of pivot member 70. One end portion of each respective spring member 76 and 78 is attached or otherwise coupled to the differential linkage member 68, whereas the opposite end portion of each respective spring member is attached to the frame of the work machine such as to respective frame members 80 and 82. In this particular embodiment, the centered or neutral position of pedals 64 and 66 corresponds to the differential linkage member 68 being in a substantially straight and undeflected or unpivoted position as illustrated in FIG. 4. In this position, the upper portion of each respective pedal 64 and 66 rests on the opposite end portions of linkage member 68 such that each pedal 64 and 66 is in the same position relative to each other. As either pedal 64 or 66 is deflected or pressed forward against linkage member 68 and away from that pedal's centered or neutral position, the linkage member 68 will pivot about pivot member 70 thereby causing the opposite pedal to move an equal amount in the opposite direction. Also, deflection of either pedal will extend one of the spring members 76 and 78 a certain amount, such that when foot pressure is removed from both pedals 64 and 66 or such foot pressures falls below a threshold foot pressure, the spring members 76 and 78 will return the linkage member 68 to its normal "at rest" position as illustrated in FIG. 4. This "at rest" position corresponds to both pedals 64 and 66 being located at their respective centered or neutral positions. In a preferred embodiment, the respective spring members 76 and 78 are attached to frame members 80 and 82 at a position associated with the work machine which is higher than the position and location of the differential linkage member 68. In this regard, it is recognized and anticipated that the attachment of the respective spring members 76 and 68 to the work machine at other locations relative to the position and location of the linkage member 68 is likewise possible depending upon the construction and space limitations associated with the operator cab compartment of the particular work machine.

It is recognized that as one pedal is deflected or depressed towards the floor of the operator cab such as depressing pedal 64, a portion of the pedal 64 will engage the linkage member 68 as the member 68 is pivoted about pivot member 70. The same will likewise be true with respect to the engagement of linkage member 68 with the upper portion of pedal 66. In this regard, the linkage member 68 is positioned heightwise relative to the top portion of each respective pedal 64 and 66 such that at full deflection of each pedal in either the fore or aft direction, at least a portion of the upper portion of each respective pedal will remain engaged with the linkage member 68. Since the pedals 64 and 66 are equally spaced from pivot member 70 and since the spring members 76 and 78 are likewise equally spaced from pivot member 70, the angular rotation of the linkage member 68 about pivot member 70 will produce equal and opposite differential pedal movement since the angular rotation of linkage member 68 on each opposite side of pivot member 70 will likewise be equal and opposite.

The differential pedal system 62 also includes a pedal displacement sensor 84 associated with the linkage pivot member 70, the sensor 84 being coupled to the ECM 48 as illustrated in FIG. 4. The position sensor 84 will be capable of measuring the angular rotation of the linkage member 68 in either a clockwise or counterclockwise direction and will input signals to the ECM 48 indicative of such angular displacement. The ECM 48 will thereafter be programmed to correlate the angular rotation of linkage member 68 with the actual displacement of each respective pedal relative to its centered or neutral position. Based upon the signal inputs from sensor 84, ECM 48 is likewise capable of determining the rate of movement of each pedal 64 and 66 when depressed or deflected by the operator based upon the rate of angular displacement of the linkage member 68 as previously explained with respect to the embodiment illustrated in FIG. 2. Other sensor arrangements capable of outputting a signal representative of the actual displacement of each respective pedal 64 and 66 are possible. In all other respects, ECM 48 is again programmed to output appropriate signals to appropriate machine systems to control the speed, acceleration, deceleration and jerk of the machine in either the forward or reverse direction based upon pedal displacement and the rate of movement of either pedal 64 or pedal 66.

Figure 5:
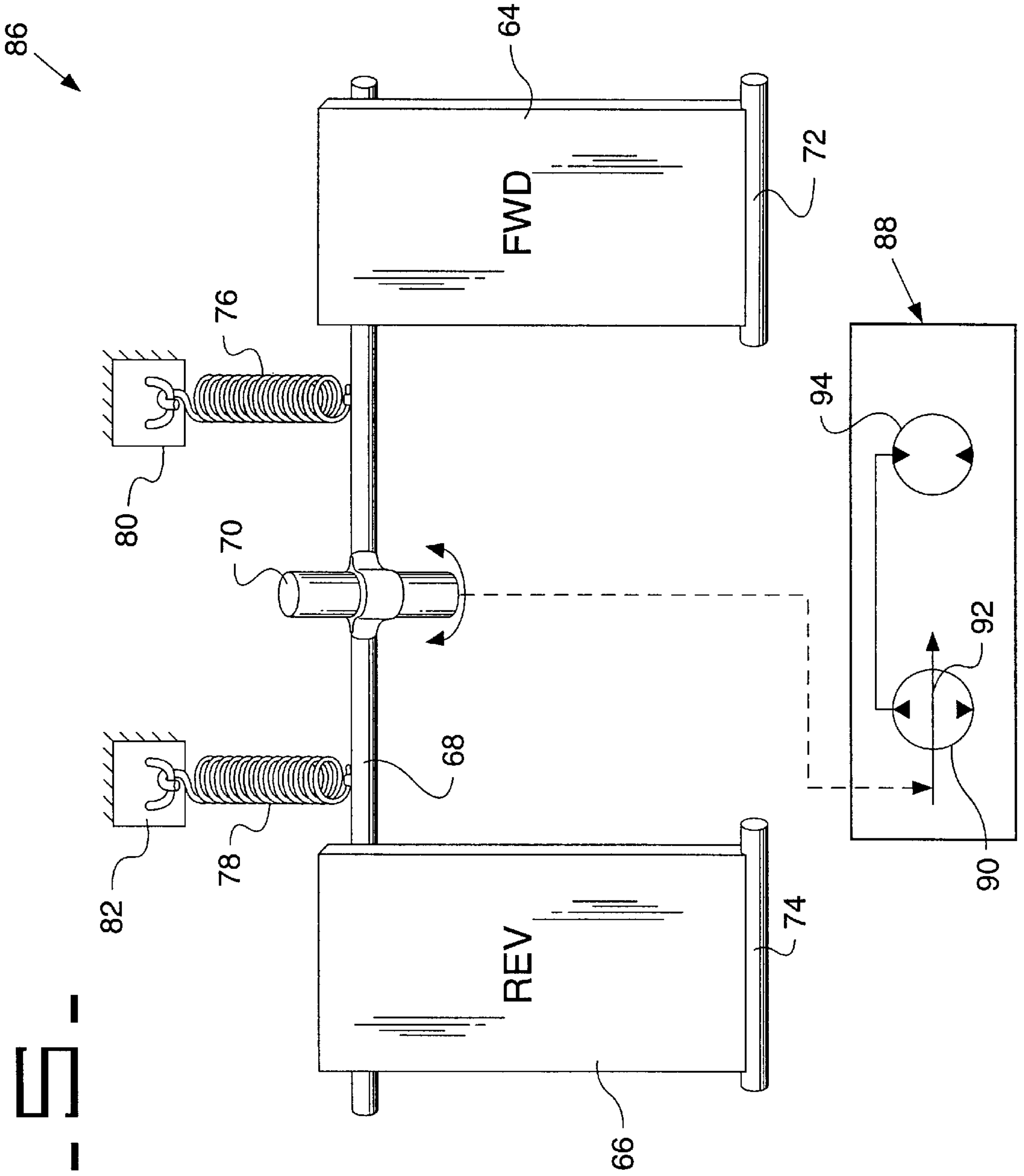
FIG. 5 is a schematic diagram showing still another embodiment of the present differential pedal system.

FIG. 5 illustrates another embodiment 86 of the present differential pedal system wherein the pedal system is mechanically linked to a hydrostatic continuously variable transmission 88 associated with a particular work machine. The operation of the pedals 64 and 66, the differential linkage member 68, the linkage pivot member 70 and the spring members 76 and 78 illustrated in FIG. 5 are substantially identical to the operation of the same corresponding members illustrated in the embodiment 62 illustrated in FIG. 4. In other words, the differential movement of the pedals 64 and 66 in FIG. 5 is achieved through the same operating mechanism as differential movement of the pedals 64 and 66 illustrated in FIG. 4. The differential pedal system 86 illustrated in FIG. 5 differs from the differential pedal system 62 illustrated in FIG. 4 in that the position sensor 84 and the ECM 48 have been eliminated and the rotational movement of the linkage pivot member 70 which corresponds to the differential movement of the pedals 64 and 66 is mechanically linked directly to the swash plate 92 associated with the variable displacement hydrostatic pump 90 which forms a part of the hydrostatic transmission 88.

The mechanical connection between the linkage pivot member 70 and the swash plate 92 is well known in the art and will typically comprise linkage specifically designed to control the angular movement of the swash plate 92 associated with the hydrostatic pump 90. The hydrostatic transmission 88 will likewise include a fixed displacement hydrostatic motor 94 as illustrated in FIG. 5. The reversible hydrostatic pump 90 (variable displacement) is typically driven by the work machine engine (not shown). The pump in turn causes the fixed displacement hydrostatic motor 94 to rotate. The speed of the motor is based in part on, the pump displacement and machine load. The hydrostatic motor 94 typically drives a differential (not shown) which in turn drives the drive axles (not shown) associated with the particular work machine. The differential drive axles are connected to the drive wheels (not shown) of the work machine. In operation, the work machine engine speed is typically held constant and the forward or reverse ground speed of the work machine is varied through rotation of the pump swash plate 92. For illustrative purposes, the centered or neutral position of swash plate 92 is illustrated in FIG. 5 and this centered or neutral swash plate position corresponds to a swash plate angle of zero and likewise corresponds to the centered or neutral position of the respective pedals 64 and 66 as likewise illustrated in FIG. 5.

When the swash plate 92 is at its neutral position and the swash plate angle is zero, no oil flow results within the hydrostatic pump-motor circuit illustrated in FIG. 5. As a result, the speed of the hydrostatic motor 94 is likewise zero and no power is transmitted to the differential drive axles of the work machine. The work machine therefore remains stationary. As an operator displaces the pedals 64 and 66 in a particular direction, the swash plate angle changes and that causes oil flow to occur in the pump-motor circuit of the hydrostatic transmission 88, which oil flow in turn causes the hydrostatic motor 94 to rotate with a certain speed. The greater the change in swash plate angle, the greater the motor speed. Since the hydrostatic motor 94 is coupled to the differential drive axles of the work machine, the rotational speed of the hydrostatic motor 94 controls the ground speed of the work machine in either the forward or reverse direction.

The directional movement of the work machine is controlled based upon the direction of angular movement of the swash plate 92. For example, if the swash plate 92 rotates, for example, in a clockwise direction, the hydrostatic motor 94 will rotate in one direction causing forward movement of the work machine, whereas if the swash plate 92 rotates, for example, in a counterclockwise direction, the hydrostatic motor 94 will rotate in the opposite direction thereby causing reverse movement of the work machine. Movement of the swash plate 92 in a particular direction is tied directly to the movement of the pedals 64 and 66 via the mechanical linkage coupled therebetween. The speed and direction of rotation of the hydrostatic motor 94 will therefore be some function of the position of the differential pedals 64 and 66 and this will control movement of the work machine in either the forward or reverse direction based upon pedal position. Similarly, the rate of change of the swash plate angle controls the acceleration, deceleration and jerk of the work machine and the rate of change of the swash plate angle will be some function of the differential pedal position with respect to time. For example, the acceleration or deceleration of the hydrostatic motor 94 will be proportional to the rate of change of the swash plate angle which, in turn, will be proportional to the rate of change of the differential pedal displacement. As a result, the differential pedal system 86 is operatively connected to the hydrostatic transmission 88 such that differential movement of the pedals 64 and 66 will selectively engage the transmission 88 such that the work machine will be operated in either the forward or reverse direction as explained above. The acceleration, deceleration and jerk of the work machine will be controlled based upon the rate of movement of the pedals 64 and 66.

The various embodiments of the present differential pedal system therefore provide a single operator control input to more easily and intuitively control the speed, acceleration, deceleration and jerk of a particular work machine in both the forward and reverse direction.

INDUSTRIAL APPLICABILITY

As described herein, the present differential pedal systems have particular utility in a wide variety of applications wherein work machines or other vehicles now utilize a signal pedal system, or other interface mechanisms for controlling the movement and operation of a work machine. The present pedal systems allow for a more intuitive and easier method of controlling the speed, acceleration, deceleration and jerk of a particular work machine in both the forward and reverse directions. Use of any one embodiment of the present pedal system yields better results on rough, irregular terrain; it fosters a high degree of precision with respect to controlling desired speed and direction; and it allows a less experienced operator to operate a particular work machine at that machine's full potential.

Depending upon the particular type of work machine involved, ECM 48 will typically output appropriate signals to appropriate machine systems such as engine and transmission control systems for selectively controlling the operation, speed and maneuverability of a particular machine. In some applications, ECM 48 may output signals solely to the transmission control system associated with the particular machine and, in other applications, ECM 48 may output signals both to an engine speed controller as well as to a transmission controller in order to control the desired parameters. It is recognized and anticipated that ECM 48 can output signals to other control devices associated with a particular work machine in order to control the speed, acceleration, deceleration, and jerk of the machine.

Electronic controllers or modules such as ECM 48 are commonly used in association with work machines for accomplishing a wide variety of various tasks. In this regard, ECM 48 will typically include processing means such as a microcontroller or microprocessor, associated electronic circuitry such as input/output circuitry, analog circuit or programmed logic arrays, and associated memory. The ECM 48 can therefore be programmed to sense and recognize the appropriate signals indicative of the displacement of the pedals 26, 28, 64 and 66 as inputted from sensors 44, 46 and/or 84, and based upon such sensed conditions, ECM 48 will provide appropriate output signals to control the speed, acceleration, deceleration and jerk of the particular work machine in accordance with teachings of the present invention.

As is evident from the foregoing description, certain aspects of the present invention are not limited to the particular details of the examples illustrated herein, and it is therefore contemplated that other modifications and applications will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. A differential pedal interface system for controlling the forward and reverse movement of a work machine comprising:

a pair of foot pedals, said foot pedals being coupled to each other for differential movement such that when one pedal is displaced in one direction the other pedal is displaced an equal amount in the opposite direction, each of said foot pedals being moveable relative to a neutral position, movement of one of said pedals in a particular direction relative to its neutral position controlling movement of the work machine in the forward direction and movement of the other of said pedals in a particular direction relative to its neutral position controlling movement of the work machine in the reverse direction;

at least one sensor positioned and located for determining the displacement of said pedals relative to their respective neutral position;

an electronic controller coupled to said at least one sensor for receiving signals therefrom, said controller being operable to receive a signal from said at least one sensor indicative of the displacement of said pedals in a particular direction relative to their respective neutral positions;

said controller outputting a signal to control the forward and reverse movement of the work machine when said controller receives a signal from said at least one sensor indicative of the displacement of said pedals in a particular direction relative to their respective neutral positions, the amount of pedal displacement in a particular direction relative to that pedal's neutral position controlling the speed of the work machine in the associated direction; and a pedal lock mechanism for locking said pedals in their respective neutral positions so as to prevent movement thereof.

2. The differential pedal interface system as set forth in claim 1 wherein said work machine includes an operator compartment, said pedal lock mechanism being coupled to switch means located in the operator compartment of the work machine, said pedal lock mechanism being selectively engageable by the operator of the work machine.

3. The differential pedal interface system as set forth in claim 1 wherein said work machine includes an operator seat, said pedal lock mechanism being coupled to the operator seat and being automatically engageable when an operator is not present in the seat.

4. A differential pedal interface system for controlling the forward and reverse movement of a work machine comprising:

a pair of foot pedals, said foot pedals being coupled to each other for differential movement such that when one pedal is displaced in one direction the other pedal is displaced an equal amount in the opposite direction, each of said foot pedals being moveable relative to a neutral position, movement of one of said pedals in a particular direction relative to its neutral position controlling movement of the work machine in the forward direction and movement of the other of said pedals in a particular direction relative to its neutral position controlling movement of the work machine in the reverse direction;

at least one sensor positioned and located for determining the displacement of said pedals relative to their respective neutral position;

an electronic controller coupled to said at least one sensor for receiving signals therefrom, said controller being operable to receive a signal from said at least one sensor indicative of the displacement of said pedals in a particular direction relative to their respective neutral positions;

said controller outputting a signal to control the forward and reverse movement of the work machine when said controller receives a signal from said at least one sensor indicative of the displacement of said pedals in a particular direction relative to their respective neutral positions, the amount of pedal displacement in a particular direction relative to that pedal's neutral position controlling the speed of the work machine in the associated direction; and a speed control unit operable to select the maximum speed of the work machine, said speed control unit being coupled to said electronic controller and outputting a signal thereto indicative of the maximum machine speed selected, said controller correlating the speed of the work machine as dictated by the amount of displacement of said pedals in a particular direction relative to their respective neutral positions in accordance with the signal received from said speed control unit.

5. A differential pedal interface system for controlling the forward and reverse movement of a work machine comprising:

a pair of foot pedals, said foot pedals being coupled to each other for differential movement such that when one pedal is displaced in one direction the other pedal is displaced an equal amount in the opposite direction, each of said foot pedals being moveable relative to a neutral position, movement of one of said pedals in a particular direction relative to its neutral position controlling movement of the work machine in the forward direction and movement of the other of said pedals in a particular direction relative to its neutral position controlling movement of the work machine in the reverse direction;

at least one sensor positioned and located for determining the displacement of said pedals relative to their respective neutral position;

an electronic controller coupled to said at least one sensor for receiving signals therefrom, said controller being operable to receive a signal from said at least one sensor indicative of the displacement of said pedals in a particular direction relative to their respective neutral positions;

said controller outputting a signal to control the forward and reverse movement of the work machine when said controller receives a signal from said at least one sensor indicative of the displacement of said pedals in a particular direction relative to their respective neutral positions, the amount of pedal displacement in a particular direction relative to that pedal's neutral position controlling the speed of the work machine in the associated direction, wherein said controller determines the rate of movement of the respective pedals in a direction relative to their respective neutral positions based upon the signals received from said at least one sensor, each rate of pedal movement determined by said controller corresponding to a predetermined rate of acceleration or deceleration of the work machine, said controller outputting a signal to control the acceleration and deceleration of the work machine in both the forward and reverse directions when said controller determines the rate of movement of said pedals, the rate of movement of said pedals in one direction establishing the rate of acceleration of the work machine to a desired speed in either the forward or reverse direction, and the rate of movement of said pedals in the opposite direction establishing the rate of deceleration of the work machine in either the forward or reverse direction.

6. A differential pedal interface system for controlling the forward and reverse movement of a work machine comprising:

a pair of foot pedals, said foot pedals being coupled to each other for differential movement such that when one pedal is displaced in one direction the other pedal is displaced an equal amount in the opposite direction, each of said foot pedals being moveable relative to a neutral position, movement of one of said pedals in a particular direction relative to its neutral position controlling movement of the work machine in the forward direction and movement of the other of said pedals in a particular direction relative to its neutral position controlling movement of the work machine in the reverse direction, said pair of foot pedals coupled to each other through a linkage member, said linkage member being pivotally rotatable about a pivot member positioned and located between said pair of pedals;

at least one sensor positioned and located for determining the displacement of said pedals relative to their respective neutral position; and, an electronic controller coupled to said at least one sensor for receiving signals therefrom, said controller being operable to receive a signal from said at least one sensor indicative of the displacement of said pedals in a particular direction relative to their respective neutral positions;

said controller outputting a signal to control the forward and reverse movement of the work machine when said controller receives a signal from said at least one sensor indicative of the displacement of said pedals in a particular direction relative to their respective neutral positions, the amount of pedal displacement in a particular direction relative to that pedal's neutral position controlling the speed of the work machine in the associated direction.

7. A differential pedal interface system for controlling the forward and reverse movement of a work machine comprising:

a first pedal actuatable by the left foot of an operator and a second pedal actuatable by the right foot of an operator, said first and second pedals being coupled to each other such that when one pedal is displaced a certain amount in one direction the other pedal is displaced an equal amount in the opposite direction, each of said first and second pedals being movable fore and aft relative to a centered position, movement of one of said first and second pedals in a forward direction relative to its centered position controlling movement of the work machine in the forward direction and movement of the other of said first and second pedals in a forward direction relative to its centered position controlling movement of the work machine in the reverse direction;

a first sensor coupled to said first pedal for determining the displacement of said first pedal in the forward direction relative to its centered position;

a second sensor coupled to said second pedal for determining the displacement of said second pedal in the forward direction relative to its centered position; and an electronic controller coupled to said first and second sensors for receiving signals therefrom, said controller being operable to receive a signal from said first sensor indicative of the displacement of said first pedal in the forward direction relative to its centered position and a signal from said second sensor indicative of the displacement of said second pedal in the forward direction relative to its centered position;

said controller outputting a signal to control the forward and reverse speed of the work machine when said controller receives a signal from said first and second sensors indicative of the displacement of said first and second pedals, the amount of pedal displacement of said first pedal in a forward direction relative to its centered position determining the speed of the work machine in one direction, and the amount of pedal displacement of said second pedal in the forward direction relative to its centered position determining the speed of the work machine in the other direction.

8. The differential pedal interface system as set forth in claim 7 including a centering mechanism coupled to said first and second pedals, said centering mechanism including means for automatically returning said first and second pedals to their respective centered positions when the foot pressure exerted against said pedals is below a threshold foot pressure.

9. The differential pedal interface system as set forth in claim 8 wherein said means for automatically returning said first and second pedals to their respective centered positions includes spring biasing means coupled to a belt and pulley system, displacement of said first and second pedals away from their respective centered positions acting against said spring biasing means so as to return said pedals to their respective centered positions when the foot pressure exerted against said first and second pedals is below a threshold foot pressure.

10. The differential pedal interface system as set forth in claim 7 including a pedal lock mechanism for locking said first and second pedals in their respective centered positions so as to prevent movement thereof.

11. The differential pedal interface system as set forth in claim 10 wherein said first and second pedals are coupled to each other through a belt and pulley system, at least one of said pulleys including an opening extending therethrough, said pedal lock mechanism including an electrically activated solenoid having a plunger member associated therewith, said solenoid being operable to engage the plunger member with said pulley opening.

12. The differential pedal interface system as set forth in claim 7 including operator selectable means for selecting the maximum speed of the work machine, said operator selectable means being coupled to said electronic controller and outputting a signal thereto indicative of the maximum machine speed selected, said controller outputting a signal to control the forward and reverse speed of the work machine when said controller receives signals from said first and second sensors indicative of the displacement of said pedals in the forward direction relative to their respective centered positions and a signal from said operator selectable means indicative of the maximum speed of the work machine selected for use.

13. The differential pedal interface system as set forth in claim 12 wherein said operator selectable means includes means for selecting a maximum engine speed for the work machine, said operator selectable means being coupled to said electronic controller and outputting a further signal thereto indicative of the maximum engine speed selected, said controller correlating the speed of the work machine in both the forward and reverse directions in accordance with the further signal received from said operator selectable means indicative of the maximum engine speed selected for use.

14. The differential pedal interface system as set forth in claim 7 wherein said controller determines the rate of movement of said first and second pedals in both the fore and aft directions when said pedals are located forward of their respective centered positions based upon the signals received from said first and second sensors, each rate of pedal movement determined by said controller when said pedals are moved in a direction away from their respective centered positions corresponding to a predetermined rate of acceleration of the work machine, and each rate of pedal movement determined by said controller when said pedals are moved in a direction towards their respective centered positions corresponding to a predetermined rate of deceleration of the work machine, said controller outputting a signal to control the acceleration and deceleration of the work machine in both the forward and reverse directions when said controller determines the rate of movement of said pedals.

15. The differential pedal interface system as set forth in claim 14 wherein said controller controls machine jerk through its control of the acceleration and deceleration of the work machine in both the forward and reverse directions.

16. A differential pedal interface system for controlling the forward and reverse movement of a work machine having a hydrostatic transmission, said system comprising:

a first pedal actuatable by the right foot of an operator and a second pedal actuatable by the left foot of an operator, said first and second pedals being coupled for differential movement such that when one pedal is displaced a certain amount in one direction, the other pedal is displaced an equal amount in the opposite direction, each of said first and second pedals being movable relative to a neutral position, movement of one of said first and second pedals in a particular direction relative to its neutral position controlling movement of the work machine in the forward direction and movement of the other of said first and second pedals in a particular direction relative to its neutral position controlling movement of the work machine in the reverse direction, said first and second pedals being operatively coupled to the hydrostatic transmission for selectively engaging the transmission to control the forward and reverse movement of the work machine, the amount of pedal displacement of said first pedal in a particular direction relative to its neutral position determining the speed of the work machine in the forward direction, and the amount of pedal displacement of said second pedal in a particular direction relative to its neutral position determining the speed of the work machine in the reverse direction; and a pedal lock mechanism for locking said pedals in their respective neutral positions so as to prevent movement thereof.

17. The differential pedal interface system as set forth in claim 16 wherein the hydrostatic transmission includes a swash plate selectively moveable for controlling the forward and reverse movement of the work machine, said first and second pedals being operatively coupled to said swash plate for controlling the movement thereof, movement of said swash plate in one direction controlling the movement of the work machine in the forward direction and being a function of the amount of pedal displacement of one of said first and second pedals in a particular direction relative to its neutral position, the movement of said swash plate in another direction controlling the movement of the work machine in the reverse direction and being a function of the amount of pedal displacement of the other of said first and second pedals in a particular direction relative to its neutral position.

18. The differential pedal interface system as set forth in claim 17 wherein the acceleration and deceleration of the work machine is proportional to the rate of change of the swash plate position, and wherein the rate of movement of said first and second pedals both away from and towards their respective neutral positions is proportional to the rate of change of the swash plate position, each rate of pedal movement when said pedals are moved in a direction away from their respective neutral positions corresponding to a predetermined rate of acceleration of the work machine, and each rate of pedal movement when said pedals are moved in a direction towards their respective neutral positions corresponding to a predetermined rate of deceleration of the work machine.

19. The differential pedal interface system as set forth in claim 16 including a centering mechanism for automatically returning said first and second pedals to their respective neutral positions when foot pressure exerted against said pedals is below a threshold foot pressure.

20. A differential pedal interface system for controlling the forward and reverse movement of a work machine comprising:

a pair of foot pedals, said foot pedals being coupled to each other for differential movement such that when one pedal is displaced in one direction the other pedal is displaced an equal amount in the opposite direction;

at least one sensor adapted to sense a characteristic indicative of the displacement of said pedals and responsively generate a displacement signal; and an electronic controller adapted to receive said displacement signal, and responsively generate an output signal to control the forward and reverse movement of the work machine, the amount of pedal displacement in a particular direction controlling the speed of the machine in the associated direction, wherein said electronic controller further comprises at least one pedal displacement map, said map correlating a pedal displacement with a desired machine movement, said controller comparing said pedal displacement with said map and responsively determining said desired machine movement.

21. A differential pedal interface system, as set forth in claim in claim 20, wherein each of said pedals being moveable relative to a neutral position, movement of one of said pedals in a particular direction relative to its neutral position controlling movement of the work machine in the forward direction, and movement of the other of said pedals in a particular direction relative to its neutral position controlling movement of the work machine in the reverse direction.

22. A differential pedal system, as set forth in claim 21, wherein said at least one sensor is further adapted to sense the displacement of said pedals relative to said pedals neutral position.

* * * * *